United States Patent
Xiao

(10) Patent No.: US 12,107,753 B2
(45) Date of Patent: Oct. 1, 2024

(54) METHOD AND DEVICE FOR COMPUTING GLOBAL CONCURRENT OPTIMIZATION PATH, AND COMPUTER READABLE STORAGE MEDIUM

(71) Applicant: XI'AN ZHONGXING NEW SOFTWARE CO., LTD., Xi'An (CN)

(72) Inventor: Shuchao Xiao, Shenzhen (CN)

(73) Assignee: XI'AN ZHONGXING NEW SOFTWARE CO., LTD., Xi'An (CN)

(*) Notice: Subject to any disclaimer, the term of this patent is extended or adjusted under 35 U.S.C. 154(b) by 309 days.

(21) Appl. No.: 17/630,384

(22) PCT Filed: Jul. 23, 2020

(86) PCT No.: PCT/CN2020/103798
§ 371 (c)(1),
(2) Date: Jan. 26, 2022

(87) PCT Pub. No.: WO2021/027519
PCT Pub. Date: Feb. 18, 2021

(65) Prior Publication Data
US 2022/0294724 A1 Sep. 15, 2022

(30) Foreign Application Priority Data
Aug. 15, 2019 (CN) .......................... 201910754127.5

(51) Int. Cl.
H04L 45/02 (2022.01)
H04L 45/12 (2022.01)

(52) U.S. Cl.
CPC .............. *H04L 45/02* (2013.01); *H04L 45/12* (2013.01)

(58) Field of Classification Search
None
See application file for complete search history.

(56) References Cited

U.S. PATENT DOCUMENTS 9,270,597 B2   2/2016   Bernstein et al.
2014/0328587 A1* 11/2014 Magri ................ H04J 14/0257
                                                                   398/34
(Continued)

FOREIGN PATENT DOCUMENTS

CN   102439886 B   7/2014
CN   105897329 A   8/2016
(Continued)

OTHER PUBLICATIONS

Castro, et al. "Global Concurrent Optimization: Advantages and Opportunities in Flexgrid-Based Networks," IEEE 15th International Conference on Transparent Optical Networks, Jun. 2013, pp. 1-4.
(Continued)

*Primary Examiner* — Xavier S Wong
(74) *Attorney, Agent, or Firm* — Vivacqua Crane, PLLC

(57) ABSTRACT

A method and device for computing a global concurrent optimization path, and a non-transitory computer-readable storage medium are disclosed. The method may include: computing, by a PCE, an actual path for each of at least one service sequentially based on a topology to serve as an actual best path; allocating, by the PCE, an actual spectrum resource sequentially for the actual path, to serve as an actual best spectrum resource; computing, by the PCE, an actual target value for all services in accordance with a target function, to serve as an actual best target value; and reordering a subset of services, recomputing an actual path for each of the subset of services and reallocating a spectrum resource, recomputing an actual target value for all services, updating the actual best target value, and updating the actual best path and the actual best spectrum resource, by the PCE.

20 Claims, 5 Drawing Sheets

(56) References Cited

U.S. PATENT DOCUMENTS

| | | | | |
|---|---|---|---|---|
| 2015/0195296 A1* | 7/2015 | Vasseur | .................... | G06N 3/02 |
| | | | | 726/23 |
| 2018/0123943 A1* | 5/2018 | Lee | ..................... | H04L 12/4641 |
| 2019/0327174 A1* | 10/2019 | LaVigne | ................. | H04L 47/41 |

FOREIGN PATENT DOCUMENTS

| | | | |
|---|---|---|---|
| CN | 106789707 | A | 5/2017 |
| CN | 103427929 | B | 11/2017 |
| EP | 2916498 | A1 | 9/2015 |
| KR | 20090003275 | A | 1/2009 |
| KR | 20120043109 | A | 5/2012 |
| KR | 20130068449 | A | 6/2013 |

OTHER PUBLICATIONS

European Patent Office. Extended European Search Report for EP Application No. 20851744.1, mailed Aug. 9, 2022, pp. 1-12.

King, et al. "A PCE-Based Architecture for Application-Based Network Operations," Internet Engineering Task Force, Mar. 2015, pp. 1-71.

Korean Intellectual Property Office. First Office Action for KR Application No. 10-2022-7005580 and English translation, mailed Jul. 21, 2023, pp. 1-12.

International Searching Authority. International Search Report and Written Opinion for PCT Application No. PCT/CN2020/103798 and English translation, mailed Oct. 12, 2020, pp. 1-10.

Intellectual Property India. Examination Report for IN Application No. 202227009984 and English translation, mailed Jul. 13, 2022, pp. 1-5.

* cited by examiner

METHOD AND DEVICE FOR COMPUTING GLOBAL CONCURRENT OPTIMIZATION PATH, AND COMPUTER READABLE STORAGE MEDIUM

CROSS-REFERENCE TO RELATED APPLICATION

This application is a national stage filing under 35 U.S.C. § 371 of international application number PCT/CN2020/103798, filed on Jul. 23, 2020, which claims priority to Chinese patent application No. 201910754127. 5 filed on Aug. 15, 2019. The contents of these applications are incorporated herein by reference in their entirety.

TECHNICAL FIELD

Embodiments of the present disclosure relate to the field of optical transmission network communication, and in particular to a method and a device for computing a global concurrent optimization path in an optical transmission network, and a non-transitory computer-readable storage medium.

BACKGROUND

In order to realize the computation of concurrent multi-service paths, in some cases, it is common practice to transform the network topology, the existing TE LSPs and their constraints into mathematical models and solve it using a mixed integer linear programming method, which is denoted as MILP. Commonly used commercial solvers are CPLEX, Gurobi and XPRESS, and open source non-commercial solvers are CBC, SCIP, etc. However, these solvers can only handle problems with linear models, but cannot handle problems with nonlinear models. For example, common solvers cannot handle problems of some complex models in the optical network structure. Moreover, with the expansion of the network topology and the increase of the number of service paths, the time taken to compute service paths by using solvers also increases exponentially. Further, the price of a commercial solver is very high, and it is generally charged on a per-unit-per-year basis, which is also a very important consideration.

In some other cases, a brute forth solving method is adopted. Specifically, the commonly used target functions include: a Minimize aggregate Bandwidth Consumption (MBC) target function, a Minimize the load of the Most Loaded Link (MLL) target function, and a Minimize Cumulative Cost of a set of paths (MCC) target function. The above brute force solving method computes the paths for the services sequentially according to the order of different service paths in accordance with the target function, and finally acquires the best result that satisfies the target function. The result finally acquired by this brute force solving method is the best result satisfying the target function, that is, the gap between the finally acquired result and the best result satisfying the target function is zero. However, with the increase of the number of service paths, the time spent by this brute force solving solution method increases dramatically, and the total amount of time is huge. This situation is unacceptable in the specific application process.

To sum up, in some cases, there is the problem of not being able to handle complex models in the optical network structure, the problem of a large gap (i.e., small proximity) between the computed service path result and the best result satisfying the target function, the problem of high cost of using the device, and the problem of a long time spent on computing service paths when the topology scales up.

SUMMARY

In view of this, embodiments of the present disclosure provide a method and device for computing a global concurrent optimization path, and a non-transitory computer-readable storage medium.

An embodiment of the present disclosure provides a method for computing a global concurrent optimization path, which may include: computing, by a path computation element (PCE), an actual path for each service in one or more services sequentially based on a topology to serve as an actual best path; allocating, by the PCE, an actual spectrum resource sequentially for the actual path to serve as an actual best spectrum resource; computing, by the PCE, an actual target value for all services in accordance with a target function to serve as an actual best target value; and reordering a subset of services in the one or more services, recomputing actual paths for services in the subset of services and reallocating a spectrum resource, recomputing an actual target value for all the services, updating the actual best target value, and updating the actual best path and the actual best spectrum resource, by the PCE, until the following is met: the number of times of recomputations reaches a threshold, and/or a difference between the actual best target value and the minimum target value for all the services is less than or equal to a predetermined value, where the actual best target value is a minimum value among all calculated actual target values.

An embodiment of the present disclosure further provides a device for computing a global concurrent optimization path, which may include: a memory storing computer-executable instructions; and a processor coupled to the memory, where the computer-executable instructions, when executed by the processor, cause the device to implement the above method for computing a global concurrent optimization path.

An embodiment of the present disclosure further provides a non-transitory computer-readable storage medium storing a computer program, where the computer program is configured to execute the above method for computing a global concurrent optimization path.

The above description is only an overview of a part of the technical scheme of the present disclosure, which can be implemented according to the contents of the specification in order to enable a clear understanding of the technical means of the present disclosure, and in order to make the above and other objectives, features and advantages of the present disclosure more obvious and easier to understand, specific implementations of the present disclosure are provided below.

BRIEF DESCRIPTION OF DRAWINGS

Various advantages and benefits will become apparent to those having ordinary skills in the art upon reading the following detailed description of the embodiments. The accompanying drawings are for the purpose of illustrating the embodiments, rather than a limitation to the present disclosure. Furthermore, throughout the accompanying drawings, the same reference symbols are used to denote the same components. In the accompanying drawings.

DETAILED DESCRIPTION

Figure 1A:
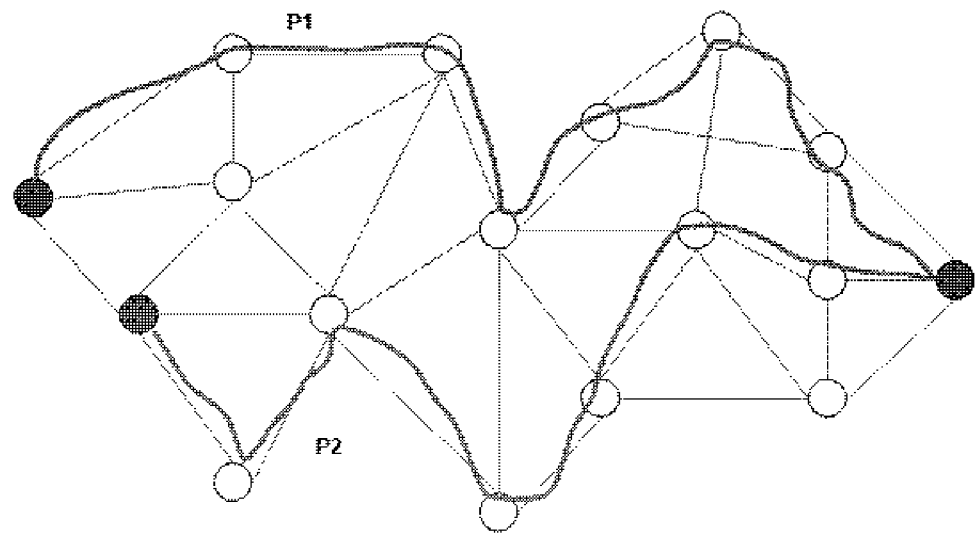
FIG. 1A is a schematic diagram of a service path provided by an embodiment of the present disclosure.

Exemplary embodiments of the present disclosure will be described in more detail below with reference to the accompanying drawings. Although exemplary embodiments of the present disclosure are shown in the accompanying drawings, it should be understood, however, that the present disclosure may be implemented in various forms and should not be limited by the embodiments set forth herein. On the contrary, these embodiments are provided in order to enable a more thorough understanding of the present disclosure and to enable a complete communication of the scope of the present disclosure to those having ordinary skills in the art.

In the structure of an optical transmission network, a path computation element (PCE) is a functional entity dedicated to path computation in the network, which can compute, based on the known network topology and constraints, an optimal path satisfying the constraints according to a request of a path computation client (PCC).

The PCE and PCC may be located anywhere in the network, either integrated in a network device, or as independent devices respectively. For example, the PCE may be integrated inside a software defined optical network (SDON) controller. The PCC and the PCE may communicate with each other through a dedicated communication protocol to submit a path computation request and obtain a path computation result. For example, the PCC and the PCE may communicate through a PCE communication protocol (PCEP).

In order to realize the computation of concurrent multi-service paths, one of the existing methods is the global concurrent optimization (GCO) path computation method. The GCO technology is based on all the traffic engineering (TE) label switched paths (LSPs) that have been established in the network topology, and at the same time takes into consideration the respective constraints of the established services to obtain an optimal set of path results. By way of example, the service constraints include nodes to be passed, nodes to be avoided, links to be passed and/or links to be avoided, etc.

GCO is mainly applied in centralized network structures, such as PCE or SDON controllers. GCO can also be used by distributed Label Switching Routers (LSRs). However, distributed LSRs using GCO require complicated synchronization mechanism between PCEs, so as to avoid affecting the stability of the entire network.

When operators need to set up a set of services simultaneously in network planning, in order to make full use of network resources, avoid congestions in the process of path computation to the greatest extent, and obtain a relatively better set of paths, a global concurrent optimization path computation method may be employed. When a fault actually occurs in the network and a series of TE LSPs all need optimal rerouting, a global concurrent optimization path computation method may also be employed.

When a new TE LSP is added to the network or when a TE LSP is removed from the network, the global network resources will be dispersed, and the TE LSPs existing in the network will no longer provide the best resource usage. In order to improve the utilization of network resources, it is necessary to reoptimize the service paths in the network. Global concurrent optimization path computation can reoptimize the entire network by simultaneously taking into consideration the entire network topology and all existing TE LSPs and their constraints, so as to meet the constraints of all TE LSPs. In another aspect, the global concurrent optimization path computation may also reoptimize a part of the network by considering only local TE LSPs or local network topology. The process of reoptimizing the network includes readjusting the existing service paths and replacing the previous paths with new ones.

FIG. 1A is a schematic diagram of a service path provided by an embodiment of the present disclosure. As shown in FIG. 1, a set of paths includes two paths $P_1$ and $P_2$. In view of the commonly used target functions, the specific description is provided as follows.

Terms in the target functions:

A network with N links $\{L_i, (i=1 \ldots N)\}$.

Path P $\{Lpi, (i=1 \ldots K)\}$ composed of K links.

The Metric of link L is denoted as M(L). The Metric may be cost, delay, etc.

The cost of path P is denoted as C(P), where C(P)=sum $\{M(L_{pi}), (i=1 \ldots K)\}$.

The remaining bandwidth on link L is denoted as r(L).

The maximum reservable bandwidth on link L is denoted as R(L).

1) Minimize Aggregate Bandwidth Consumption (MBC) Target Function

The aggregate bandwidth consumption of all the services is minimum, that is, the value of the Aggregate bandwidth consumption is minimum.

The description of the target function is as follows: A set of paths is computed which ensure that (sum $\{R(L_i)-r(L_i), i=1 \ldots N\}$) is minimum.

$R(L_i)$ denotes the reservable bandwidth on a certain link $L_i$ in the topology. $r(L_i)$ is the remaining bandwidth on a certain link $L_i$ in the topology. The sum of $R(L_i)-r(L_i)$ being minimum means that the sum of the consumed bandwidths on all links in the result path is expected to be minimum.

2) Minimize the Load of the Most Loaded Link (MLL) Target Function

The load of the most loaded link in all the services is the minimum, that is, the value of the Load of the most loaded link is minimum.

The description of the target function is as follows: A set of paths is computed which ensure that (max $\{(R(L_i)-r(L_i))/R(L_i), i=1 \ldots N\}$) is minimum.

$R(L_i)$ denotes the reservable bandwidth on a certain link $L_i$ in the topology. $r(L_i)$ is the remaining bandwidth on a certain link $L_i$ in the topology. $R(L_i)-r(L_i)/R(L_i)$ means the utilization of the bandwidth on a certain link $L_i$. It is required that the maximum load of all links on the result path is minimum.

3) Minimize Cumulative Cost of a Set of Paths (MCC) Target Function

The cumulative cost of all service paths is minimum, that is, the value of the Cumulative TE cost is minimum.

The description of the target function is as follows: A set of paths $\{P_1 \ldots P_m\}$ is computed which ensure that (sum $\{C(P_i), i=1 \ldots m\})$ is minimum.

C(Pi) may be the sum of the costs of all links in the path, or the total sum of the delays of all links in the path.

Figure 1B:
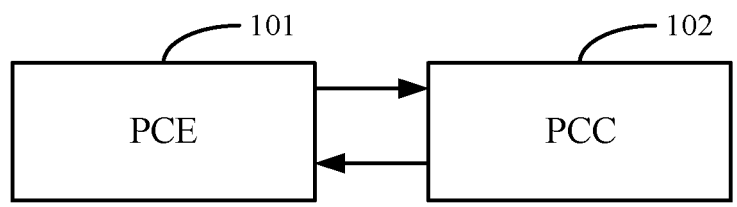
FIG. 1B is a schematic diagram of the network connection between a PCE and a PCC provided by an embodiment of the present disclosure.

FIG. 1B is a schematic diagram of the network connection between a PCE and a PCC provided by an embodiment of the present disclosure. As shown in FIG. 1B, PCE 101 and PCC 102 are connected and communicate with each other. Although FIG. 1B depicts only one PCE and one PCC, embodiments of the present disclosure do not limit the number of PCCs connected to a PCE. It should be understood that in the actual optical network structure, the number of PCEs and the number of PCCs may be one or more.

In an embodiment of the present disclosure, alternatively, PCE 101 receives a request from PCC 102 to optimize service paths for one or more services; then, PCE 101 executes a method for computing a global concurrent optimization path; and after computing an optimized path for each of the requested one or more services and allocating an actual spectrum resource for the optimized path, PCE 101 sends to PCC 102 the optimized paths and the actual spectrum resources allocated for the optimized paths.

Figure 2:
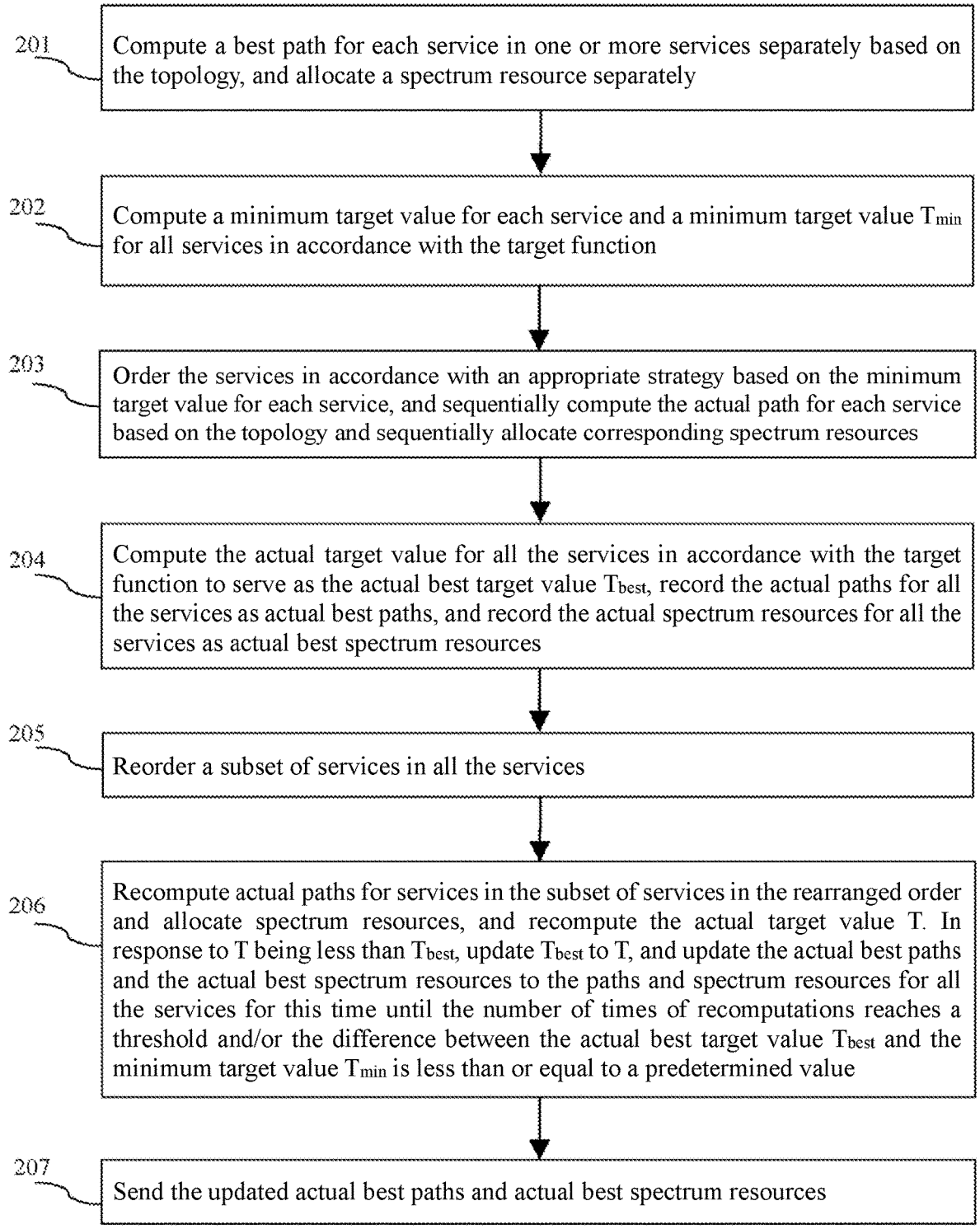
FIG. 2 is a flowchart of a process for computing a global concurrent optimization path provided by an embodiment of the present disclosure.

FIG. 2 is a flowchart of a process for computing a global concurrent optimization path provided by an embodiment of the present disclosure. In the global concurrent optimization path computation method, firstly, the PCE (for example, PCE 101 as shown in FIG. 1B) determines the best paths and the best spectrum resources for one or more services; Secondly, the PCE performs an iterative optimization process for the actual paths and actual spectrum resources for the one or more services.

Specifically, as shown in FIG. 2, in block 201, the PCE (e.g., PCE 101 as shown in FIG. 1B) separately computes the best path for each service based on the network topology and the overall spectrum resources in the network, and separately allocates a best spectrum resource for the best path for each service.

In an embodiment of the present disclosure, alternatively, in a target topology of the network, the PCE computes the service path for each service respectively by taking the target function as a constraint with the highest priority in combination with respective constraints of the services, and allocates a spectrum resource for each service. That is to say, because the PCE computes the service path for each of the one or more services and allocates spectrum resources separately without considering the situations of other services, the process necessarily obtains the best path and the best spectrum resource for each service.

In block 202, the PCE (e.g., PCE 101 as shown in FIG. 1B) computes a minimum target value for each service and a minimum target value $T_{min}$ for all the services in accordance with the target function and using the best path and the corresponding spectrum resource for each service as parameters or using the best path for each service alone as a parameter. $T_{min}$ is the minimum limit value among the target values computed for all the services in accordance with the target function, that is, the ideal target value or the limit target value. In an embodiment of the present disclosure, alternatively, the PCE (e.g., PCE 101 as shown in FIG. 1B) computes a minimum target value for each service and a minimum target value $T_{min}$ for all the services in accordance with the target function and using the best path and/or the best spectrum resource for each service as a parameter. In an embodiment of the present disclosure, alternatively, block 202 further includes recording or storing the minimum target value $T_{min}$.

In block 203, after ordering the services in accordance with an appropriate strategy based on the minimum target value for each service, the PCE (e.g., PCE 101 as shown in FIG. 1B) sequentially computes the actual path for each service in the one or more services based on the network topology and the overall spectrum resources in the network, and sequentially allocates corresponding spectrum resources. For example, in the target topology of the network, the PCE sequentially computes the actual path for each service by taking the target function as a constraint with the highest priority in combination with respective constraints of the services, and sequentially allocates the actual spectrum resources. Because the PCE needs to consider the situations of other services when computing the actual service path for each service of the one or more services and allocating an actual spectrum resource, the computed actual service path and the allocated actual spectrum resource necessarily cannot achieve the effect of the best path and the best spectrum resource.

In an embodiment of the present disclosure, alternatively, the PCE sequentially computes the actual path for each service in the order of the computed minimum target value for each service from large to small. Alternatively, the PCE sequentially computes the actual path for each service in the order of the computed minimum target value for each service from small to large. Alternatively, the PCE computes the actual path for each service in a random order.

In an embodiment of the present disclosure, alternatively, block 203 further includes ordering each service using an appropriate strategy, and then sequentially computing the actual path for each service according to the order after the ordering, and allocating corresponding spectrum resources. For example, all the services may be ordered in the order of the minimum target value for each service from large to small, in the order of the minimum target value for each service from small to large, or in a random order.

In block 204, the PCE (e.g., PCE 101 as shown in FIG. 1B) computes the actual target value T for the one or more services in accordance with the target function and using the actual service path and/or corresponding spectrum resource for each of the one or more services as parameters, and takes it as the initial actual best target value $T_{best}$. In an embodiment of the present disclosure, block 204 further includes recording or storing the actual best target value $T_{best}$, recording or storing the actual paths for all the services as initial actual best paths, and recording or storing the actual spectrum resources for all the services as initial actual best spectrum resources. In an embodiment of the present disclosure, alternatively, the PCE (e.g., PCE 101 as shown in FIG. 1B) computes the actual target value T for the one or more services in accordance with the target function and using the actual service path and/or the actual spectrum resource for each service as parameters, and takes it as the initial actual best target value $T_{best}$. In an embodiment of the present disclosure, block 204 further includes recording or storing the actual best target value $T_{best}$, the actual best path and the actual best spectrum resource.

In block 205, the PCE (e.g., PCE 101 as shown in FIG. 1B) reorders a subset of services in the one or more services. In block 206, the PCE (e.g., PCE 101 as shown in FIG. 1B)

recomputes actual paths for services in the subset of services in the rearranged order and reallocates corresponding spectrum resources, and recomputes the actual target value T. In response to T being less than $T_{best}$, the actual best target value $T_{best}$ is updated to T, and the actual best path and the actual best spectrum resource are updated to the path and spectrum resource for all the services for this time until the number of times of recomputations reaches a threshold and/or the difference between the actual best target value $T_{best}$ and the minimum target value $T_{min}$ is less than or equal to a predetermined value. In block 207, the PCE (e.g., PCE 101 as shown in FIG. 1B) sends to the PCC (e.g., PCC 102 as shown in FIG. 1B) the updated actual best path and actual best spectrum resource. That is to say, the PCE sends to the PCC the finally obtained actual service path and actual spectrum resource for each service in the one or more services.

Figure 3:
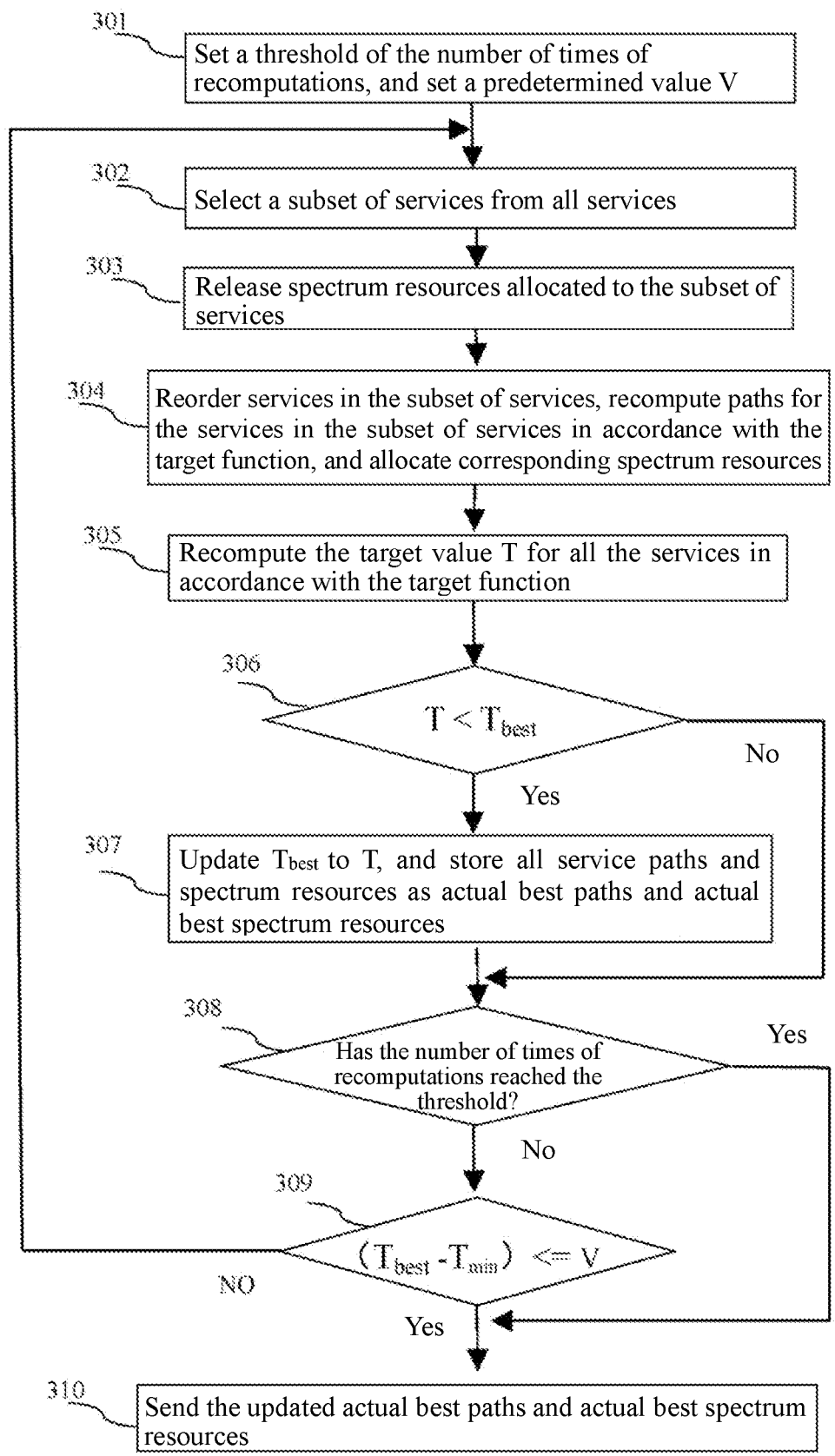
FIG. 3 is a flowchart of a process for service path determination and spectrum iterative optimization provided by an embodiment of the present disclosure.

FIG. 3 is a flowchart of a process for service path determination and spectrum iterative optimization provided by an embodiment of the present disclosure. FIG. 3 describes in detail the iterative optimization process performed by the PCE for the actual paths and actual spectrum resources for the one or more services. For example, FIG. 3 further describes in detail the method steps of blocks 205, 206 and 207 in the example of FIG. 2.

Specifically, as shown in FIG. 3, in block 301, the PCE (e.g., PCE 101 as shown in FIG. 1B) sets a threshold of the number of times of recomputations (i.e., the number of times of iterations) and sets a predetermined value V. In an embodiment of the present disclosure, alternatively, the predetermined value V may be a product of a predetermined scaling value S associated with the minimum target value $T_{min}$ and the minimum target value $T_{min}$, where the predetermined scaling value S is a non-negative value greater than or equal to zero. 1−S is a target superiority. That is, $V=T_{min}*S$. Therefore, in response to the difference between the actual best target value $T_{best}$ and the minimum target value $T_{min}$ being equal to the predetermined value V, $T_{best}$ is the product of $T_{min}$ and (1+S), that is, $T_{best}=T_{min}*(1+S)$.

In block 302, a subset of services is selected from all the services in the one or more services. In an embodiment of the present disclosure, alternatively, from the sequence of all the services, a part of services are selected as the subset of services in accordance with an appropriate strategy. In block 303, spectrum resources allocated to the subset of services are released. In block 304, the services in the subset of services are reordered, the paths for the services in the subset of services are recomputed in accordance with the target function, and corresponding spectrum resources are allocated.

In an embodiment of the present disclosure, alternatively, the subset of services may be either services in all the services of the one or more services that are successively ordered or services in all the services that are not successively ordered.

By way of example, it is assumed that the current sequence of all the services is $B_0, B_1, B_2, \ldots, B_i, \ldots, B_j, \ldots, B_k, \ldots, B_n$. The strategy of selecting the subset of services from the sequence and the strategy of reordering the subset of services may include the following approaches:

1) From the current service sequence, services $B_i$ and $B_j$ are randomly selected, where i<j. That is to say, the subset of services selected from the current service sequence are $B_i$, $B_j$ and all services between $B_i$ and $B_j$. Next, the order of $B_i$, $B_j$ and all the services between $B_i$ and $B_j$ is reversed sequentially for reordering. Thereafter, the PCE recomputes the service path for each service in the selected subset of services in accordance with the order $B_j, B_{j-1}, \ldots, B_{i+1}, B_i$. In addition, the paths for other services in the one or more services than the selected subset of services remain unchanged.

2) From the current service sequence, m services are randomly selected, where m>=2, for example, a total of m services are selected, $B_i, B_j, B_k, \ldots$, where i<j<k. Then, the order of the m services $B_i, B_j, B_k, \ldots$ is reversed sequentially for reordering. Thereafter, the PCE recomputes the actual service paths for the rearranged part of m services in accordance with the order of $\ldots, B_k, B_j, B_i$, and allocates corresponding spectrum resources for the recomputed actual service paths. In addition, the paths and the allocated spectrum resources for other services in the one or more services than the selected subset of services remain unchanged.

In an embodiment of the present disclosure, alternatively, block 304 further includes recomputing paths for the selected subset of services in an appropriate order based on the network topology by taking the target function as a constraint with the highest priority in combination with respective constraints of the selected part of services, and allocating corresponding spectrum resources.

The PCE releases the actual spectrum resource allocated to each service in the selected subset of services, so that the overall network idle spectrum resources include the idle spectrum resources before release and the actual spectrum resources of the selected part of service that have just been released; then, based on the topology and the idle spectrum resources, the PCE recomputes the actual path for each service in the selected subset of services in the rearranged order of services, and reallocates the actual spectrum resources.

In block 305, the target value T is recomputed for all the services in accordance with the target function. In block 306, it is determined whether the recomputed target value T is less than $T_{best}$. In response to T being less than $T_{best}$, block 307 is executed to update $T_{best}$ to T, and store all service paths and spectrum as actual best paths and actual best spectrum resources. For example, the service path for each service in all the services and the spectrum resource allocated for each service are stored as the actual best path and spectrum resource. In response to T being not less than $T_{best}$, block 308 is executed to determine whether the number of times of recomputations performed by the PCE has reached a set threshold.

In response to the number of times of recomputations performed by the PCE (e.g., PCE 101 as shown in FIG. 1B) having reached the set threshold, block 310 is executed. In response to the number of times of recomputations performed by the PCE not reaching the set threshold, block 309 is executed.

In block 309, it is determined whether the difference between the actual best target value $T_{best}$ and the minimum target value $T_{min}$ is less than or equal to a predetermined value V. In response to $(T_{best}-T_{min})$ being less than or equal to the predetermined value V, block 310 is executed. In response to $(T_{best}-T_{min})$ being greater than the predetermined value V, block 302 is executed. In an embodiment of the present disclosure, alternatively, block 309 further includes setting the value of the predetermined value V. By way of example, the predetermined value V may be set to a product of a predetermined scaling value S associated with the minimum target value $T_{min}$ and the minimum target value $T_{min}$, where the predetermined scaling value S is a non-negative value greater than or equal to zero.

In block 310, the PCE (e.g., PCE 101 as shown in FIG. 1B) sends to the PCC (e.g., PCC 102 as shown in FIG. 1B) the updated actual best path and actual best spectrum resource. That is to say, the PCE sends to the PCC the finally obtained actual service path and actual spectrum resource for each service in the one or more services.

Specifically, in an embodiment of the present disclosure, alternatively, the process of recomputing the target value T and updating the actual best target value $T_{best}$ includes: storing the previously computed actual best target value $T_{best}$ computed for all the services; storing the previously computed actual best paths and spectrum resources for all the services; recomputing an actual path for each service in the selected part of services in the rearranged order and allocating a corresponding spectrum resource; recomputing the actual target value T in accordance with the target function and using the actual path and/or corresponding spectrum resource for each service in all the services as parameters; in response to the recomputed actual target value T being less than the stored actual best target value $T_{best}$, updating the stored actual best target value $T_{best}$ to the recomputed actual target value T, and updating the stored actual best path and spectrum resource to the path and spectrum resource for all the services for this time.

Therefore, in the determination of the initial best path and the best spectrum resource for a service (e.g., block 201), the embodiment of the present disclosure adopts a greedy idea, and can obtain an initial result path with better superiority. Further, the embodiment of the present disclosure can achieve a better balance between the superiority of the concurrent path computation result and the computation time consumed. If the scale of the network topology is not large, the threshold (i.e., the number of times of iterations) may be set larger, and the predetermined scaling value S (e.g., the predetermined scaling value associated with the minimum target value $T_{min}$) may be set smaller, so that the superiority of the computed path result satisfying the target function will be better. If the scale of the network topology is large, the threshold (i.e., the number of times of iterations) may be reduced, and the predetermined scaling value S may be set larger, so that the purpose of not consuming too much computational time can be achieved at the expense of a certain degree of superiority.

In order to more vividly describe the main processing procedures involved in the method and system of the embodiments of the present disclosure, three specific embodiments are described in detail below.

In an embodiment of the present disclosure, the number of consumed wavelengths is subtracted from the total number of wavelengths in the link to obtain the number of available wavelengths in the link. For example, in a specific link, the bandwidth of one wavelength is 50 GHZ and the total bandwidth on the link is 500 GHZ, so the total number of wavelengths in the link is 10. It is assumed that, on a link, the total number of wavelengths is 10 and the number of consumed wavelengths is 2, then the number of available wavelengths on the link is 8.

Figure 4:
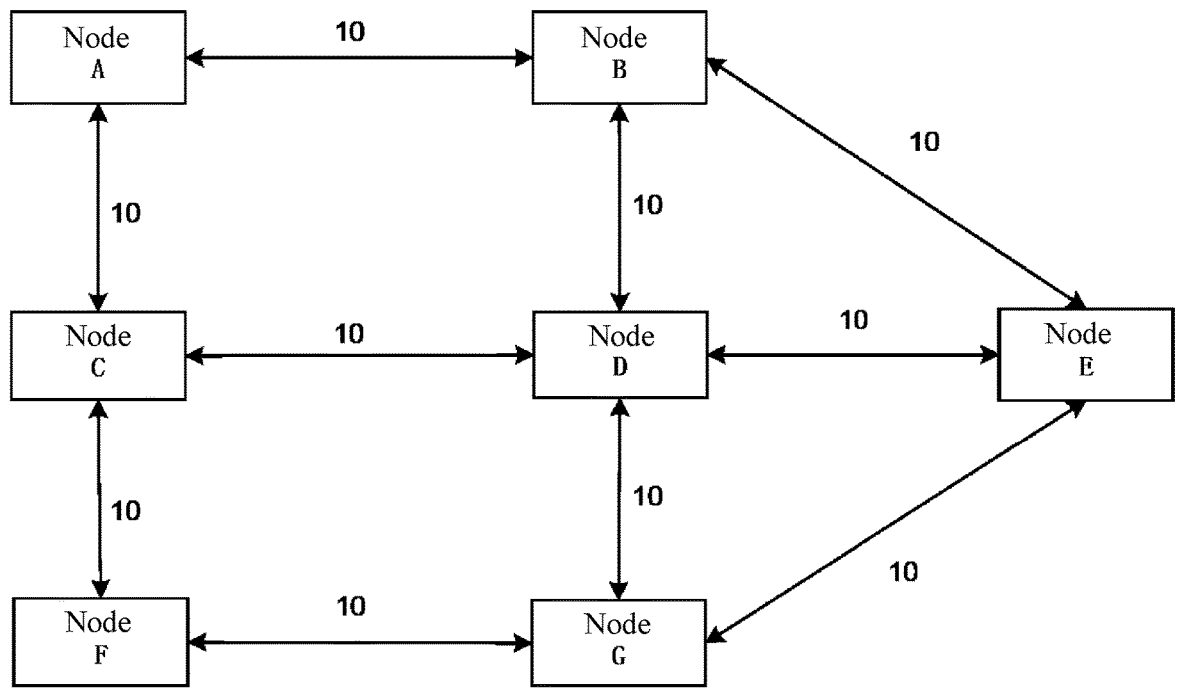
FIG. 4 is a schematic diagram of an optical transmission network topology provided by an embodiment of the present disclosure.

FIG. 4 is a schematic diagram of another optical transmission network topology provided by an embodiment of the present disclosure. In this embodiment, the specific way of minimize aggregate bandwidth consumption global concurrent optimization is adopted, and the Minimize aggregate Bandwidth Consumption (MBC) target function is adopted.

As shown in FIG. 4, the network topology consists of nodes A, B, C, D, E, F and G. The figure next to a link of the network as shown in FIG. 4 indicates the number of available wavelengths on the link.

By way of example, in the network topology as shown in FIG. 4, the following 4 services need to be implemented. It should be understood that the number and types of services that can be realized by the embodiment of FIG. 4 may vary and are not limited.

Service 1: A-E, where the head node is A, and the tail node is E.

Service 2: B-G, where the head node is B, and the tail node is G.

Service 3: F-B, where the head node is F, and the tail node is B.

Service 4: D-G, where the head node is D, and the tail node is G.

It is assumed that each service occupies a fixed-width wavelength on each link through which it passes.

The method for computing a global concurrent optimization path in the network topology as shown in FIG. 4 mainly includes the following step one and step two. Each sub-step of step one and step two corresponds to the step executed by each block in the flowcharts of FIGS. 2 and 3, which are described in detail as follows.

Step One: Determining Initial Actual Best Paths and Best Spectrum for Services.

In block 201, in a target topology, the best paths for the services are respectively computed by taking the target function as a constraint with the highest priority in combination with the respective constraints of the services, and the best spectrum resources are allocated. It is assumed that the result paths are as follows.

The path for service 1 is A-B-E.
The path for service 2 is B-D-G.
The path for service 3 is F-G-D-B.
The path for service 4 is D-G.

In block 202, the minimum target value $T_{min}$ of the best path for all the services is evaluated in accordance with the MBC target function (sum $\{R(Li)-r(Li), i=1 \ldots N\}$). Because each service occupies a fixed-width wavelength on each link through which it passes, the total number of wavelengths of a service path is the number of links that the service passes through. Therefore, the total number of wavelengths of the path for service 1 is 2, the total number of wavelengths of the path for service 2 is 2, the total number of wavelengths of the path for service 3 is 3, and the total number of wavelengths of service 4 is 1. Therefore, $T_{min}$ is the total number of wavelengths of all the services, and the value of $T_{min}$ is 2+2+3+1=8.

In block 203, after randomly disrupting the services, the order of services is 3, 2, 4, 1. In accordance with the order of the total number of wavelengths from large to small, the services are ordered in the order of 3, 2, 1, 4. According to the rearranged order of services, in the target topology, the actual paths for the services are computed sequentially by taking the target function as a constraint with the highest priority in combination with respective constraints of the services, and the actual spectrum resources are allocated. It is assumed that the result paths are as follows:

The path for service 3 is F-G-D-B, and the total number of wavelengths of the path evaluated by the target function is 3.

The path for service 2 is B-E-G, and the total number of wavelengths of the path evaluated by the target function is 2.

The path for service 1 is A-C-F-G-E, and the total number of wavelengths of the path evaluated by the target function is 4.

The path for service 4 is D-E-G, and the total number of wavelengths of the path evaluated by the target function is 2.

In block 204, the total number of wavelengths of the actual paths for all the services is evaluated as 3+2+4+2=11 in accordance with the target function, which is denoted as $T_{best}$, and the actual path and allocated actual spectrum for each service are recorded as the initial actual best path and spectrum resource.

Step Two: Iterative Optimization of Service Paths and Spectrum.

In block 301, the maximum number of times of iterative computations (i.e., threshold) is set to 2, and the predetermined scaling value S is set to 0.1, then the predetermined value $V=T_{min}*S=8*0.1=0.8$.

First Iterative Computation (Recomputation):

In block 302, from the service sequence 3, 2, 1, 4, services $B_i$ and $B_j$ are randomly selected, where i<j, and it is assumed that $B_i$ is service 2 and $B_j$ is service 1.

The order of the selected services is adjusted, where the order of services of $B_i$ and $B_j$ and services between the two is reversed sequentially. That is, the adjusted order of the selected services is 1, 2.

In block 303, the spectrum resources occupied by services 1 and 2 (i.e., services $B_i$ and $B_j$) are released from the topology.

In block 304, in the target topology, the actual paths for service 1 and service 2 are recomputed in the order of services 1 and 2 by taking the target function as a constraint with the highest priority in combination with respective constraints of the services, and the actual spectrum resources are allocated. It is assumed that the result paths are as follows:

The path for service 3 is F-G-D-B, and the total number of wavelengths of the path evaluated by the target function is 3.

The new path for service 1 is A-C-D-E, and the total number of wavelengths of the path evaluated by the target function is 3.

The new path for service 2 is B-E-G, and the total number of wavelengths of the path evaluated by the target function is 2.

The path for service 4 is D-E-G, and the total number of wavelengths of the path evaluated by the target function is 2.

In block 305, the total number of wavelengths of all the service paths is evaluated as 3+3+2+2=10 in accordance with the target function, which is denoted as T.

In blocks 306 and 307, because $T(10)<T_{best}(11)$, $T_{best}$ is updated to T, and the actual path for each service and the allocated actual spectrum resource are recorded as the best result.

In block 308, it is determined whether the number of times of recomputations reaches the maximum number of times of iterative computations. The current number of times of iterations (the number of times of recomputations) is 1, which has not reached the set maximum number of times of iterative computations of 2, so the process proceeds to block 309.

In block 309, because $(T_{best}-T_{min})>V$, that is, the difference between the value 10 of $T_{best}$ and the value 8 of $T_{min}$ is 2, and V is the product of the value 8 of $T_{min}$ and S, 8*0.1=0.8, and the difference 2 is greater than the value 0.8 of V, so the process proceeds to block 302.

Second Iterative Computation (Recomputation):

In block 302, from the service sequence 3, 1, 2, 4, services $B_i$ and $B_j$ are randomly selected, where i<j, and it is assumed that $B_i$ is service 1 and $B_j$ is service 4.

The order of the selected services is adjusted, where the order of services of $B_i$ and $B_j$ and services between the two is reversed sequentially. That is, the adjusted order of the selected services is 4, 2, 1.

In block 303, the spectrum resources occupied by services 4, 2 and 1 are released from the topology.

In block 304, in the target topology, the actual paths for services 4, 2 and 1 are recomputed in the order of services 4, 2 and 1 by taking the target function as a constraint with the highest priority in combination with respective constraints of the services, and the actual spectrum resources are allocated. It is assumed that the result paths are as follows:

The path for service 3 is F-G-D-B, and the total number of wavelengths of the path evaluated by the target function is 3.

The new path for service 4 is D-G, and the total number of wavelengths of the path evaluated by the target function is 1.

The new path for service 2 is B-E-G, and the total number of wavelengths of the path evaluated by the target function is 2.

The new path for service 1 is A-C-F-G-E, and the total number of wavelengths of the path evaluated by the target function is 4.

In block 305, the total number of wavelengths of all the service paths is evaluated as 3+1+2+4=10 in accordance with the target function, which is denoted as T.

In blocks 306 and 307, because $T(10)=T_{best}(10)$, $T_{best}$ is not updated to T.

In block 308, it is determined whether the number of times of recomputations reaches the maximum number of times of iterative computations. In this case, the number of times of iterations (the number of times of recomputations) is 2, which has reached the maximum number of times of iterative computations of 2, so the process proceeds to block 310.

In block 310, the recorded best results of the actual paths and allocated actual spectrum resources for the services are output.

Figure 5:
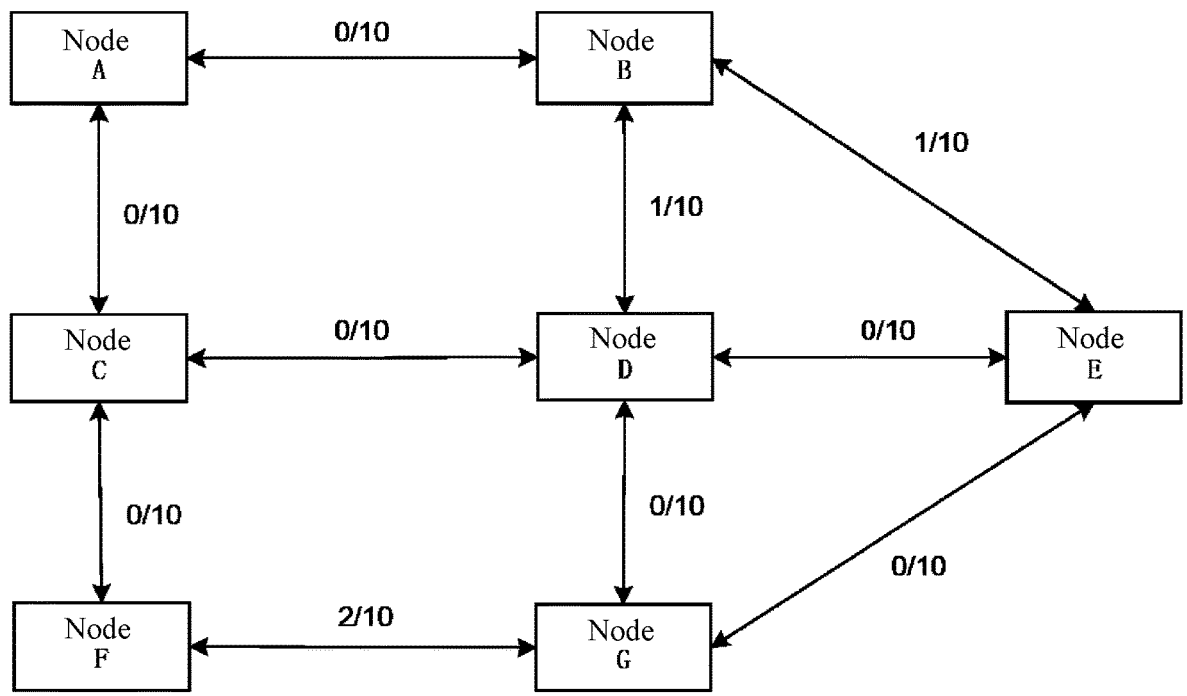
FIG. 5 is a schematic diagram of another optical transmission network topology provided by an embodiment of the present disclosure.

FIG. 5 is a schematic diagram of another optical transmission network topology provided by an embodiment of the present disclosure. In this embodiment, the specific way of minimize the load of the most loaded link global concurrent optimization is adopted, and the Minimize the load of the Most Loaded Link (MLL) target function is adopted.

As shown in FIG. 5, the topology consists of nodes A, B, C, D, E, F and G. The figure next to a link indicates the ratio of the number of consumed wavelengths on the link to the total number of wavelengths on the link, that is, the number of consumed wavelengths/the total number of wavelengths.

By way of example, similar to FIG. 4, the following 4 services need to be implemented in the network topology of FIG. 5. It should be understood that the number and types of services that can be realized by the embodiment of FIG. 5 may vary and are not limited.

Service 1: A-E, where the head node is A, and the tail node is E.

Service 2: B-G, where the head node is B, and the tail node is G.

Service 3: F-B, where the head node is F, and the tail node is B.

Service 4: D-G, where the head node is D, and the tail node is G.

It is assumed that each service occupies a fixed-width wavelength on each link through which it passes.

Similar to FIG. 4, the execution of the method for computing a global concurrent optimization path in the network topology as shown in FIG. 5 mainly includes the following step one and step two, and each sub-step of step one and step two corresponds to the step executed by each block in the flowcharts of FIGS. 2 and 3.

Step One: Determining Initial Actual Best Paths and Best Spectrum for Services.

In block 201, in a target topology, the best paths for the services are respectively computed by taking the target function as a constraint with the highest priority in combination with the respective constraints of the services, and the best spectrum resources are allocated. It is assumed that the result paths are as follows:

The path for service 1 is A-B-E.

The path for service 2 is B-D-G.

The path for service 3 is F-G-D-B.

The path for service 4 is D-G.

In block 202, the target value $T_{min}$ for the service paths is evaluated in accordance with the MLL target function (max $\{(R(Li)-r(Li))/R(Li), i=1 \ldots N\}$). Specifically, the target value for the service paths is computed in accordance with the MLL target function and using the number of consumed wavelengths/the total number of wavelengths on each link of the service path as a parameter; and then the target value $T_{min}$ for all the services is computed in accordance with the MLL target function.

The following target values are obtained through computation in accordance with the MLL target function, i.e., the target value for the path for service 1 is 2/10, the target value for the path for service 2 is 2/10, the target value for the path for service 3 is 3/10 and the target value for the path for service 4 is 1/10, then the target value $T_{min}$ for all the services computed in accordance with the MLL target function is max(2/10, 2/10, 3/10, 1/10)=3/10.

In block 203, after randomly disrupting the services, the order of services is 3, 4, 2, 1. The services are reordered in the order of the computed target values for the service paths from large to small, and the order after ordering is 3, 2, 1, 4. Thereafter, according to the rearranged order of services, in the target topology, the actual paths for the services are computed sequentially by taking the target function as a constraint with the highest priority in combination with respective constraints of the services, and the actual spectrum resources are allocated. It is assumed that the result paths are as follows:

The path for service 3 is F-G-D-B, in which case the target value for the path evaluated by the target function is 3/10.

The path for service 2 is B-E-G, in which case the target value for the path evaluated by the target function is 2/10.

The path for service 1 is A-C-F-G-E, in which case the target value for the path evaluated by the target function is 4/10.

The path for service 4 is D-E-G, in which case the target value for the path evaluated by the target function is 3/10.

In block 204, the total target value for all service paths evaluated in accordance with the target function is max(3/10, 2/10, 4/10, 3/10)=4/10, which is denoted as $T_{best}$, and the actual path and the allocated actual spectrum resource for each service are recorded as the initial actual best path and spectrum resource.

Step Two: Iterative Optimization of Service Paths and Spectrum.

In block 301, the maximum number of times of iterative computations is set to 2, and the predetermined scaling value S is set to 0.1, then the predetermined value $V=T_{min}*S=(3/10)*0.1=0.03$.

First Iterative Computation (Recomputation):

In block 302, from the service sequence 3, 2, 1, 4, services $B_i$ and $B_j$ are randomly selected, where i<j, and it is assumed that $B_i$ is service 2 and $B_j$ is service 1.

The order of the selected services is adjusted, where the order of services of $B_i$ and $B_j$ and services between the two is reversed sequentially. That is, the adjusted order of the selected services is 1, 2.

In block 303, the spectrum resources occupied by services 1 and 2 are released from the topology.

In block 304, in the target topology, the actual paths for services 1 and 2 are recomputed in the order of services 1 and 2 by taking the target function as a constraint with the highest priority in combination with respective constraints of the services, and the actual spectrum resources are allocated. It is assumed that the result paths are as follows:

The path for service 3 is F-G-D-B, in which case the target value for the path evaluated by the target function is 3/10.

The new path for service 1 is A-C-D-E, in which case the target value for the path evaluated by the target function is 1/10.

The new path for service 2 is B-E-G, in which case the target value for the path evaluated by the target function is 2/10.

The path for service 4 is D-E-G, in which case the target value for the path evaluated by the target function is 2/10.

In block 305, the total target value for all the service paths evaluated in accordance with the target function is max(3/10, 1/10, 2/10, 2/10)=3/10, which is denoted as T.

In blocks 306 and 307, because $T(3/10)<T_{best}(4/10)$, $T_{best}$ is updated to T, and the actual path for each service and the allocated actual spectrum resource are recorded as the best result.

That is, after being updated, the value of $T_{best}$ is 3/10.

In block 308, it is determined whether the number of times of recomputations reaches the maximum number of times of iterative computations. In this case, the number of times of iterations (the number of times of recomputations) is 1, which has not reached the maximum number of times of iterative computations of 2, so the process proceeds to block 309.

In block 309, because $(T_{best}-T_{min})<V$, that is, the difference between the value 3/10 of $T_{best}$ and the value 3/10 of $T_{min}$ is 0, and V is the product of the value 3/10 of $T_{min}$ and S, (3/10)*0.1=0.03, and the difference 0 is less than the value 0.03 of V, so the process proceeds to block 310.

In block 310, the recorded best results of the actual paths and actual spectrum resources for the services are output.

Figure 6:
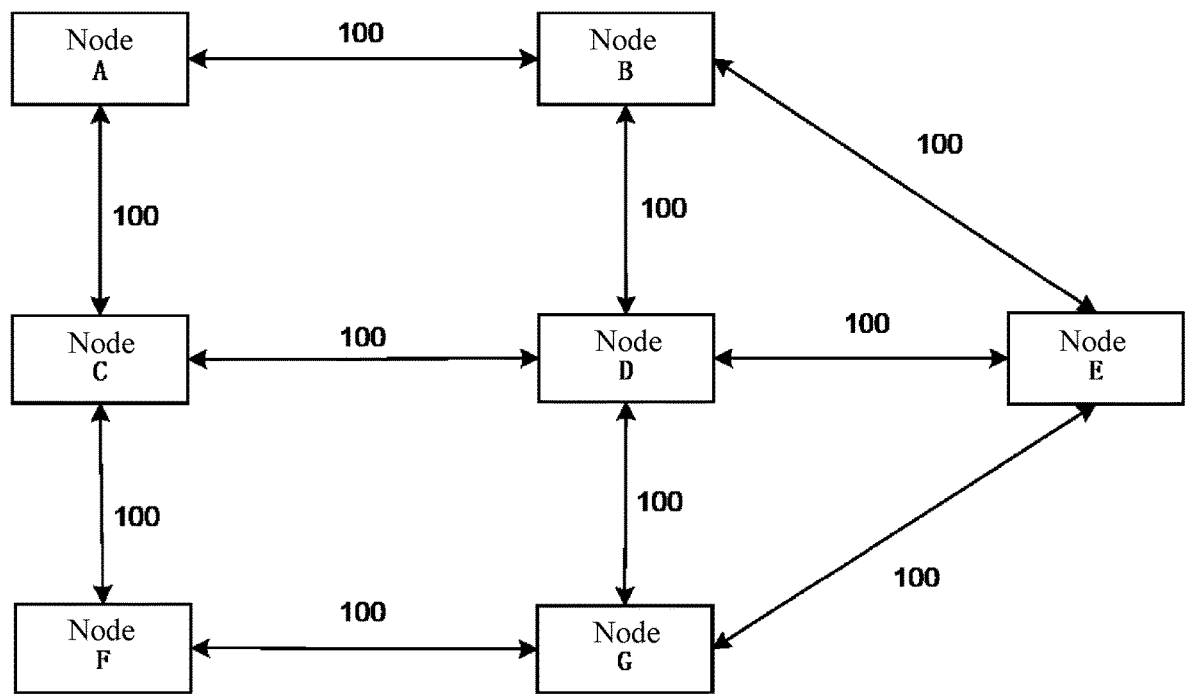
FIG. 6 is a schematic diagram of another optical transmission network topology provided by an embodiment of the present disclosure.

FIG. 6 is a schematic diagram of another optical transmission network topology provided by an embodiment of the present disclosure. In this embodiment, the specific way of minimize cumulative cost of a set of paths global concurrent optimization is adopted, and the Minimize Cumulative Cost of a set of paths (MCC) target function is adopted.

As shown in FIG. 6, the topology consists of nodes A, B, C, D, E, F and G. The figure next to a link indicates the cost of the link. Alternatively, the cost of the link may be distance, delay or jitter.

By way of example, similar to FIGS. 4 and 5, the following 4 services need to be implemented in the network topology of FIG. 6. It should be understood that the number and types of services that can be realized by the embodiment of FIG. 6 may vary and are not limited.

Service 1: A-E, where the head node is A, and the tail node is E.

Service 2: B-G, where the head node is B, and the tail node is G.

Service 3: F-B, where the head node is F, and the tail node is B.

Service 4: D-G, where the head node is D, and the tail node is G.

It is assumed that each service occupies a fixed-width wavelength on each link through which it passes.

Similar to FIGS. 4 and 5, the execution of the method for computing a global concurrent optimization path in the network topology as shown in FIG. 6 mainly includes the following step one and step two, and each sub-step of step one and step two corresponds to the step executed by each block in the flowcharts of FIGS. 2 and 3.

Step One: Determining Initial Actual Best Paths and Best Spectrum for Services.

In block 201, in a target topology, the best paths for the services are respectively computed by taking the target function as a constraint with the highest priority in combination with the respective constraints of the services, and the best spectrum resources are allocated. It is assumed that the result paths are as follows:

The path for service 1 is A-B-E.

The path for service 2 is B-D-G.

The path for service 3 is F-G-D-B.

The path for service 4 is D-G.

In block 202, the target value $T_{min}$ for the service paths is evaluated in accordance with the MCC target function (sum {C(Pi), i=1 . . . m}). The cost of a service path is the sum of the costs of links on the path. Therefore, the cost of the path for service 1 is 200, the cost of the path for service 2 is 200, the cost of the path for service 3 is 300 and the cost of the path for service 4 is 100, so the target value $T_{min}$ for all the services computed in accordance with the MCC target function is the total cost 200+200+300+100=800.

In block 203, after randomly disrupting the services, the order of services is 3, 2, 4, 1. In the order of the costs of the service paths from large to small, the services are ordered in the order of 3, 2, 1, 4. According to the rearranged order of services, in the target topology, the actual paths for the services are computed sequentially by taking the target function as a constraint with the highest priority in combination with respective constraints of the services, and the actual spectrum resources are allocated. It is assumed that the result paths are as follows:

The path for service 3 is F-G-D-B, and the cost of the path evaluated by the target function is 300.

The path for service 2 is B-E-G, and the cost of the path evaluated by the target function is 200.

The path for service 1 is A-C-F-G-E, and the cost of the path evaluated by the target function is 400.

The path for service 4 is D-E-G, and the cost of the path evaluated by the target function is 200.

In block 204, the total cost of all the actual paths is evaluated as 300+200+400+200=1100 in accordance with the target function, which is denoted as $T_{best}$, and the actual paths and the allocated actual spectrum resources for the services are recorded as the initial actual best paths and spectrum resources.

Step Two: Iterative Optimization of Service Paths and Spectrum.

In block 301, the maximum number of times of iterative computations is set to 2, and the predetermined scaling value S is set to 0.1, then the predetermined value V=$T_{min}$*S=800*0.1=80.

First Iterative Computation (Recomputation):

In block 302, from the service sequence 3, 2, 1, 4, services $B_i$ and $B_j$ are randomly selected, where i<j, and it is assumed that $B_i$ is service 2 and $B_j$ is service 1.

The order of the selected services is adjusted, where the order of services of $B_i$ and $B_j$ and services between the two is reversed sequentially. That is, the adjusted order of the selected services is 1, 2.

In block 303, the spectrum resources occupied by services 1 and 2 are released from the topology.

In block 304, in the target topology, the actual paths for services 1 and 2 are recomputed in the order of services 1 and 2 by taking the target function as a constraint with the highest priority in combination with respective constraints of the services, and the actual spectrum resources are allocated. It is assumed that the result paths are as follows:

The path for service 3 is F-G-D-B, and the cost of the path evaluated by the target function is 300.

The new path for service 1 is A-C-D-E, and the cost of the path evaluated by the target function is 300.

The new path for service 2 is B-E-G, and the cost of the path evaluated by the target function is 200.

The path for service 4 is D-E-G, and the cost of the path evaluated by the target function is 200.

In block 305, in accordance with the target function, the total cost of all the service paths is evaluated as 300+300+200+200=1000, which is denoted as T.

In blocks 306 and 307, because T(1000)<$T_{best}$(1100), $T_{best}$ is updated to T, and the actual paths and the allocated actual spectrum resources for the services are recorded as the best results.

In block 308, it is determined whether the number of times of recomputations reaches the maximum number of times of iterative computations. In this case, the number of times of iterations (the number of times of recomputations) is 1, which has not reached the maximum number of times of iterative computations of 2, so the process proceeds to block 309.

In block 309, because ($T_{best}$−$T_{min}$)>V, that is, the difference between the value 1000 of $T_{best}$ and the value 800 of $T_{min}$ is 200, V is the product of the value 800 of $T_{min}$ and S, 800*0.1=80, and the difference 200 is greater than the value 80 of V, so the process proceeds to block 302.

The process proceeds to block 302.

Second Iterative Computation (Recomputation):

In block 302, from the service sequence 3, 1, 2, 4, services $B_i$ and $B_j$ are randomly selected, where i<j, and it is assumed that $B_i$ is service 1 and $B_j$ is service 4.

The order of the selected services is adjusted, where the order of services of $B_i$ and $B_j$ and services between the two is reversed sequentially. That is, the adjusted order of the selected services is 4, 2, 1.

In block 303, the spectrum resources occupied by services 4, 2 and 1 are released from the topology.

In block 304, in the target topology, the actual paths for services 4, 2 and 1 are recomputed in the order of services 4, 2 and 1 by taking the target function as a constraint with the highest priority in combination with respective constraints of the services, and the actual spectrum resources are allocated. It is assumed that the result paths are as follows:

The path for service 3 is F-G-D-B, and the cost of the path evaluated by the target function is 300.

The new path for service 4 is D-G, and the cost of the path evaluated by the target function is 100.

The new path for service 2 is B-E-G, and the cost of the path evaluated by the target function is 200.

The new path for service 1 is A-C-F-G-E, and the cost of the path evaluated by the target function is 400.

In block 305, in accordance with the target function, the total cost of all service paths is evaluated as 300+100+200+400=1000, which is denoted as T.

In blocks 306 and 307, because $T(1000)=T_{best}(1000)$, $T_{best}$ is not updated to T.

In block 308, it is determined whether the number of times of recomputations reaches the maximum number of times of iterative computations. In this case, the number of times of iterations (the number of times of recomputations) is 2, which has reached the maximum number of times of iterative computations of 2, so the process proceeds to block 310.

In block 310, the recorded best results of the actual paths and actual spectrum resources for the services are output.

Figure 7:
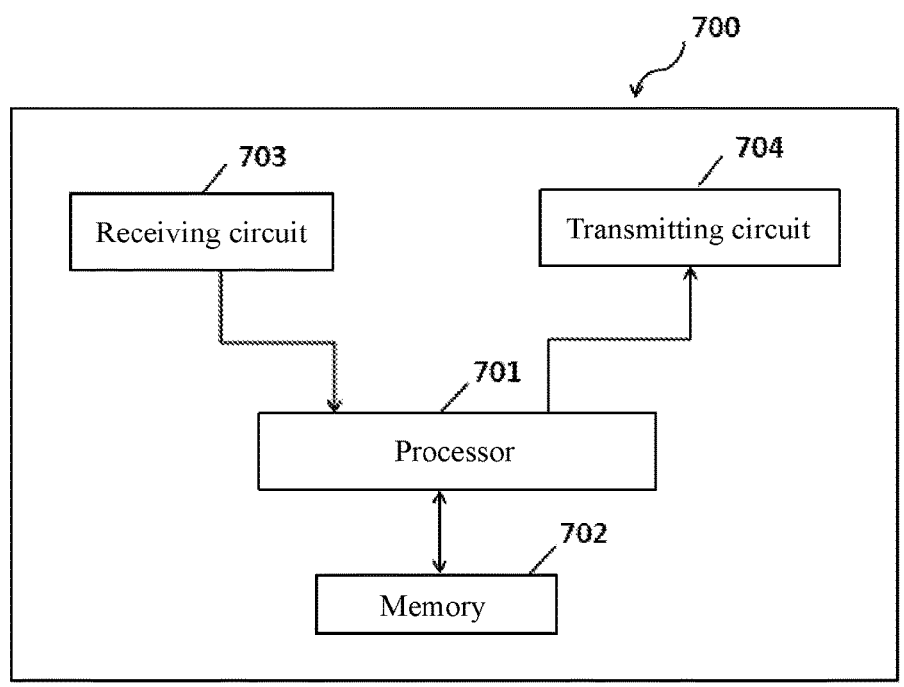
FIG. 7 is a structural schematic diagram of a PCE provided by an embodiment of the present disclosure.

FIG. 7 is a structural schematic diagram of a PCE provided by an embodiment of the present disclosure. PCE 700 may be PCE 101 in FIG. 1. PCE 700 shown in FIG. 7 includes: a memory 702 storing computer-executable instructions; and a processor 701 coupled to the memory 702, where the computer-executable instructions, when executed by the processor 701, cause the PCE 700 to implement the methods shown in FIGS. 2 to 6.

In an embodiment of the present disclosure, alternatively, PCE 700 further includes a receiving circuit 703, where the receiving circuit 703 may be specifically configured to receive a request to optimize the paths of the one or more services from a PCC (for example, PCC 102 shown in FIG. 1*i*). Then, the processor 701 of the PCE 700 may specifically execute the process of computing a global concurrent optimization path as shown in FIGS. 2 and 3, for example, it is configured to execute method steps of computing a path, allocating spectrum resources, computing the target value in accordance with the target function, and recomputing and updating the target value, etc.

In an embodiment of the present disclosure, alternatively, the PCE 700 further includes a transmitting circuit 704. After the process of computing a global concurrent optimization path is executed, the transmitting circuit 704 of the PCE 700 transmits to the PCC the optimized actual path for each of the one or more services and the actual spectrum resources allocated for these actual paths.

It should be understood that the above-mentioned and other operations and/or functions of the circuits and/or units in PCE 700 according to the embodiments of the present disclosure are respectively intended to implement the corresponding processes of the methods in FIGS. 1A to 6, and will not be further described here for the sake of brevity.

An embodiment of the present disclosure further provides a non-transitory computer-readable storage medium storing a computer program, where the computer program is configured to execute the above method.

An embodiment of the present disclosure provides a method and a device for computing a global concurrent optimization path, and a non-transitory computer-readable storage medium, which are intended to improve the proximity between a service path result and a best result meeting a target function, and shorten the time actually consumed for computing the service path after the topological scale is enlarged.

Those having ordinary skills in the art can realize that the units and/or circuits and algorithm steps of each example described in connection with the embodiments disclosed herein can be implemented in electronic hardware, or a combination of computer software and electronic hardware. Whether these functions are implemented in hardware or software depends on the specific application and design constraints of the technical scheme. Specialized technicians can use different methods to implement the described functions for each specific application, but such implementation should not be considered beyond the scope of the present disclosure.

Those skilled in the art can clearly understand that for convenience and conciseness of description, the specific working processes of the above-described systems, apparatuses and units and/or circuits can refer to the corresponding processes in the above-described embodiments of the method and will not be further described here.

In several embodiments provided by the present disclosure, it should be understood that the disclosed method, device, and apparatus may be implemented in other ways. For example, the apparatus embodiments described above are only for illustration. For example, the division of the units and/or circuits is only a logic function division. In actual implementation, there may be other division methods, for example, multiple units or assemblies may be combined or integrated into another system, or some features may be omitted or not implemented. Further, the mutual coupling or direct coupling or communication connection shown or discussed may be indirect coupling or communication connection through some interfaces, apparatuses, units and/or circuits, and may be in electrical, mechanical or other forms.

The circuits and/or units described as separate components may or may not be physically separated, and the components displayed as units may or may not be physical units, that is, they may be located in one place or distributed to multiple network units. Some or all of the units can be selected according to actual needs to achieve the purpose of the embodiment.

In addition, the functional units and/or circuits in the embodiments of the present disclosure may be integrated into one processing unit or may alternatively exist as being physically separate, or two or more of the units may be integrated into one unit.

If the functions are implemented in the form of functional units of software and sold or used as independent products, they can be stored in a non-transitory computer-readable storage medium. On the basis of this understanding, the substance or the parts that contribute to the existing technology or a part of the technical schemes of the present disclosure may be embodied in the form of a software product, which is stored in a storage medium and includes a number of instructions to cause a computer device (which can be a personal computer, a server, or a network device, etc.) to execute all or part of the steps of the method described in the embodiments of the present disclosure. The aforementioned storage medium includes: various media that can store program codes, such as a USB flash drive, a mobile hard disk, a read-only memory (ROM), a random-access memory (RAM), a magnetic disk or an optical disk.

Several embodiments are described above in the present disclosure, however the scope of protection of the present disclosure is not limited thereto, and any variations or substitutions that can be readily thought of by any person skilled in the art within the scope of the technology disclosed herein shall be covered by the scope of protection of the present disclosure. Therefore, the scope of protection of the present disclosure shall be subject to the scope of protection of the appended claims

The invention claimed is:

1. A method for computing a global concurrent optimization path, comprising:
   computing, by a path computation element (PCE), an actual path for each of at least one service sequentially based on a topology to serve as an actual best path;
   allocating, by the PCE, an actual spectrum resource sequentially for the actual path, to serve as an actual best spectrum resource;
   computing, by the PCE, an actual target value for all of the at least one service in accordance with a target function, to serve as an actual best target value; and
   reordering a subset of at least one service in the at least one service, recomputing an actual path for each of the subset of at least one service and reallocating a spectrum resource, recomputing an actual target value for all of the at least one service, updating the actual best target value, and updating the actual best path and the actual best spectrum resource comprises:
      storing a previously computed actual target value as the actual best target value;
      storing a previously computed actual path for each service as the actual best path;
      storing a previously allocated actual spectrum resource as the actual best spectrum resource;
      recomputing an actual path for each service in the subset of at least one service in a rearranged order and reallocating a corresponding spectrum resource, wherein the actual path and the actual spectrum resource for each service other than the subset of at least one service in the at least one service remain unchanged;
      recomputing the actual target value for all of the at least one service in accordance with the target function; and
      in response to the recomputed actual target value being less than the stored actual best target value, updating the stored actual best target value to the recomputed actual target value, updating the stored actual best path to the recomputed actual path for each of the at least one service, and updating the stored actual best spectrum resource to the reallocated actual spectrum resource for each of the at least one service,
   by the PCE, until at least one of following is met:
      a number of times of recomputations reaches a threshold, or
      a difference between the actual best target value and a minimum target value for all of the at least one service is less than or equal to a predetermined value,
   wherein the actual best target value is a minimum value among all computed actual target values.

2. The method of claim 1, wherein computing, by the PCE, the actual path for each of the at least one service sequentially comprises:
   computing the actual path for each service sequentially by taking the target function as a constraint with a highest priority and taking into account a respective constraint for each service.

3. The method of claim 1, wherein computing, by the PCE, the actual path for each of the at least one service sequentially further comprises one of the following:
   computing the actual path for each service sequentially in an order of a minimum target value for each service from large to small; or
   computing the actual path for each service sequentially in an order of a minimum target value for each service from small to large; or
   computing the actual path for each service sequentially in a random order.

4. The method of claim 1, further comprising:
   computing, by the PCE, a best path for each service separately based on the topology;
   allocating, by the PCE, a best spectrum resource for best path separately; and
   computing, by the PCE, a minimum target value for each service and the minimum target value for all of the at least one service according to the target function.

5. The method of claim 4, wherein computing, by the PCE, the best path for each service separately comprises:
   computing the best path for each service separately by taking the target function as a constraint with a highest priority and taking into account a respective constraint for each service.

6. The method of claim 1, wherein the target function is one of the following:
   a Minimize aggregate Bandwidth Consumption (MBC) target function, wherein the target value computed in accordance with the target function is an aggregate bandwidth consumption of paths; or
   a Minimize the load of the Most Loaded Link (MLL) target function, wherein the target value computed in accordance with the target function is the load of the most loaded link; or
   a Minimize Cumulative Cost of a set of paths (MCC) target function, wherein the target value computed in accordance with the target function is the cumulative cost of a set of paths.

7. The method of claim 1, wherein reordering, by the PCE, the subset of at least one service comprises:
   selecting the subset of at least one service sequentially from the at least one service in accordance with a current order of the at least one service; and
   reversing sequentially the order of services in the subset of at least one service for reordering.

8. The method of claim 1, wherein the subset of at least one service includes:
   services in the at least one service which are successively ordered; or
   services in the at least one service which are not successively ordered.

9. The method of claim 1, wherein the predetermined value is a product of a predetermined scaling value S and the minimum target value for all of the at least one service, the predetermined scaling value S being a non-negative value greater than or equal to zero.

10. The method of claim 1, further comprising:
    receiving, by the PCE, a path computation request for the at least one service from a path computation client (PCC); and
    sending, by the PCE, a path computation result to the PCC, wherein the path computation result comprises the actual path for each of the at least one service and the actual spectrum resource allocated for the actual path.

11. A device for computing a global concurrent optimization path, comprising:
    a memory storing computer-executable instructions; and
    a processor coupled to the memory, wherein the computer-executable instructions, when executed by the processor, cause the device to implement a method for computing a global concurrent optimization path, comprising:

computing, by a path computation element (PCE), an actual path for each of at least one service sequentially based on a topology to serve as an actual best path;

allocating, by the PCE, an actual spectrum resource sequentially for the actual path, to serve as an actual best spectrum resource;

computing, by the PCE, an actual target value for all of the at least one service in accordance with a target function, to serve as an actual best target value; and reordering a subset of at least one service in the at least one service, recomputing an actual path for each of the subset of at least one service and reallocating a spectrum resource, recomputing an actual target value for all of the at least one service, updating the actual best target value, and updating the actual best path and the actual best spectrum resource comprises:

storing a previously computed actual target value as the actual best target value;

storing a previously computed actual path for each service as the actual best path;

storing a previously allocated actual spectrum resource as the actual best spectrum resource;

recomputing an actual path for each service in the subset of at least one service in a rearranged order and reallocating a corresponding spectrum resource, wherein the actual path and the actual spectrum resource for each service other than the subset of at least one service in the at least one service remain unchanged;

recomputing the actual target value for all of the at least one service in accordance with the target function; and in response to the recomputed actual target value being less than the stored actual best target value, updating the stored actual best target value to the recomputed actual target value, updating the stored actual best path to the recomputed actual path for each of the at least one service, and updating the stored actual best spectrum resource to the reallocated actual spectrum resource for each of the at least one service, by the PCE, until at least one of following is met:
a number of times of recomputations reaches a threshold, or
a difference between the actual best target value and a minimum target value for all of the at least one service is less than or equal to a predetermined value, wherein the actual best target value is a minimum value among all computed actual target values.

12. The device for computing a global concurrent optimization path of claim 11, wherein computing, by the PCE, the actual path for each of the at least one service sequentially comprises:

computing the actual path for each service sequentially by taking the target function as a constraint with a highest priority and taking into account a respective constraint for each service.

13. The device for computing a global concurrent optimization path of claim 11, wherein computing, by the PCE, the actual path for each of the at least one service sequentially further comprises one of the following:

computing the actual path for each service sequentially in an order of a minimum target value for each service from large to small; or computing the actual path for each service sequentially in an order of a minimum target value for each service from small to large; or computing the actual path for each service sequentially in a random order.

14. The device for computing a global concurrent optimization path of claim 11, further comprising:

computing, by the PCE, a best path for each service separately based on the topology;

allocating, by the PCE, a best spectrum resource for best path separately; and computing, by the PCE, a minimum target value for each service and the minimum target value for all of the at least one service according to the target function.

15. The device for computing a global concurrent optimization path of claim 11, wherein the target function is one of the following:

a Minimize aggregate Bandwidth Consumption (MBC) target function, wherein the target value computed in accordance with the target function is an aggregate bandwidth consumption of paths; or a Minimize the load of the Most Loaded Link (MLL) target function, wherein the target value computed in accordance with the target function is the load of the most loaded link; or a Minimize Cumulative Cost of a set of paths (MCC) target function, wherein the target value computed in accordance with the target function is the cumulative cost of a set of paths.

16. A non-transitory computer-readable storage medium storing a computer program, wherein the computer program is configured to execute a method for computing a global concurrent optimization path, comprising:

computing, by a path computation element (PCE), an actual path for each of at least one service sequentially based on a topology to serve as an actual best path;

allocating, by the PCE, an actual spectrum resource sequentially for the actual path, to serve as an actual best spectrum resource;

computing, by the PCE, an actual target value for all of the at least one service in accordance with a target function, to serve as an actual best target value; and reordering a subset of at least one service in the at least one service, recomputing an actual path for each of the subset of at least one service and reallocating a spectrum resource, recomputing an actual target value for all of the at least one service, updating the actual best target value, and updating the actual best path and the actual best spectrum resource comprises:

storing a previously computed actual target value as the actual best target value;

storing a previously computed actual path for each service as the actual best path;

storing a previously allocated actual spectrum resource as the actual best spectrum resource;

recomputing an actual path for each service in the subset of at least one service in a rearranged order and reallocating a corresponding spectrum resource, wherein the actual path and the actual spectrum resource for each service other than the subset of at least one service in the at least one service remain unchanged;

recomputing the actual target value for all of the at least one service in accordance with the target function; and in response to the recomputed actual target value being less than the stored actual best target value, updating the stored actual best target value to the recomputed actual target value, updating the stored actual best path to the recomputed actual best path for each of the at least one service, and updating the stored actual best spectrum resource to the reallocated actual spectrum resource for each of the at least one service, by the PCE, until at least one of following is met:
- a number of times of recomputations reaches a threshold, or
- a difference between the actual best target value and a minimum target value for all of the at least one service is less than or equal to a predetermined value, wherein the actual best target value is a minimum value among all computed actual target values.

17. The non-transitory computer-readable storage medium of claim 16, wherein computing, by the PCE, the actual path for each of the at least one service sequentially comprises:
   computing the actual path for each service sequentially by taking the target function as a constraint with a highest priority and taking into account a respective constraint for each service.

18. The non-transitory computer-readable storage medium of claim 16, wherein computing, by the PCE, the actual path for each of the at least one service sequentially further comprises one of the following:
   computing the actual path for each service sequentially in an order of a minimum target value for each service from large to small; or
   computing the actual path for each service sequentially in an order of a minimum target value for each service from small to large; or
   computing the actual path for each service sequentially in a random order.

19. The non-transitory computer-readable storage medium of claim 16, further comprising:
   computing, by the PCE, a best path for each service separately based on the topology;
   allocating, by the PCE, a best spectrum resource for best path separately; and
   computing, by the PCE, a minimum target value for each service and the minimum target value for all of the at least one service according to the target function.

20. The non-transitory computer-readable storage medium of claim 16, wherein the target function is one of the following:
   a Minimize aggregate Bandwidth Consumption (MBC) target function, wherein the target value computed in accordance with the target function is an aggregate bandwidth consumption of paths; or
   a Minimize the load of the Most Loaded Link (MLL) target function, wherein the target value computed in accordance with the target function is the load of the most loaded link; or
   a Minimize Cumulative Cost of a set of paths (MCC) target function, wherein the target value computed in accordance with the target function is the cumulative cost of a set of paths.

* * * * *